United States Patent
Aihara et al.

(10) Patent No.: US 7,145,306 B2
(45) Date of Patent: Dec. 5, 2006

(54) METHOD, SYSTEM, AND PROGRAM FOR CONTROLLING MOVING BODY

(75) Inventors: Masaki Aihara, Wako (JP); Naohide Ogawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 65 days.

(21) Appl. No.: 11/212,686

(22) Filed: Aug. 29, 2005

(65) Prior Publication Data

US 2006/0061316 A1    Mar. 23, 2006

(30) Foreign Application Priority Data

Aug. 30, 2004  (JP)  ............................. 2004-249548
Jul. 11, 2005  (JP)  ............................. 2005-201565

(51) Int. Cl.
    B25J 13/04    (2006.01)
    B25J 9/16     (2006.01)
(52) U.S. Cl. ........................... 318/568.12; 318/568.17; 901/1
(58) Field of Classification Search ................ 318/561, 318/565, 567, 568.1, 568.11, 568.12, 568.17, 318/568.2, 568.24; 901/1, 46, 49
    See application file for complete search history.

(56) References Cited

U.S. PATENT DOCUMENTS 4,884,216 A * 11/1989 Kuperstein .................. 700/259
5,459,659 A * 10/1995 Takenaka .................... 700/260
5,936,367 A *  8/1999 Takenaka ................. 318/568.12

FOREIGN PATENT DOCUMENTS

JP    2002-144260    5/2002

* cited by examiner

Primary Examiner—Bentsu Ro
(74) Attorney, Agent, or Firm—Squire, Sanders & Dempsey LLP (57) ABSTRACT

A method of appropriately controlling functions of a moving body having a joint such as a robot in view of the content of an error detected in the functions of the moving body. A mode setting section (112) sets "a first mode" for halting first and second functions at least after the end of a starting period of the robot (200) in response to the detection of "a first error" by an error detecting section (111). The mode setting section (112) halts the first function at least after the end of the starting period in response to the detection of "a second error" by the error detecting section (111), while setting "the second mode" for adjusting control unit (100) or the like using the second function during the starting period. Furthermore, the mode setting section (112) sets "the third mode" for moving the robot (200) using the first and second functions in response to the detection of "a third error" by the error detecting section (111).

6 Claims, 4 Drawing Sheets

METHOD, SYSTEM, AND PROGRAM FOR CONTROLLING MOVING BODY

BACKGROUND OF THE INVENTION

1. Field of the Invention

The present invention relates to a method and system for controlling a moving body, which makes motions around joints, and a program for giving various functions to the system.

2. Description of the Related Art

Conventionally, there has been suggested a technical method for autonomously checking and diagnosing the functions and operations of a robot with a combination of a plurality of inputs of visual sensors mounted on a legged mobile robot and outputs of joint actuators (for example, refer to Japanese patent Laid-Open No. 2002-144260). According to the conventional technology, a user is notified of a result of error detection by means of motions of the robot if the error of a sensor, actuator, or the like is detected.

SUMMARY OF THE INVENTION

Unless a user appropriately deals with an error despite the occurrence of the error in the sensor or the like of the robot, however, the robot might provide an unexpected motion. On the other hand, if the robot autonomously halts all of the operations after an error is detected by an autonomous functional diagnosis, the functions of the robot will be limited excessively when all of the robot functions are halted uniformly in spite of a minor error.

Therefore, it is an object of the present invention to provide a method and system enabling appropriate control of functions of a moving body in view of the content of an error if the error occurs in the functions of the moving body having joints such as a robot and a program capable of giving the control function to the system.

The present invention relates to a method of controlling a function of moving body after examining whether there is any error thereof in a starting period, the moving body having a first function including a control function of a motion of the moving body accompanying with an operation of an actuator through conditioning of electric power supplied to the actuator via a drive system cable from a drive system power supply with a first sub-control unit out of a plurality of control units operating by being supplied with power via control system cables from a control system power supply and a second function including an alternate communications facility with the plurality of control units and a measuring function of a state quantity through a sensor of a second sub-control unit out of the plurality of control units.

In installing wiring of control system cables, drive system cables, and communication lines in a moving part of the moving body, it is preferable that the wiring in the moving part is as compact as possible in size for securing mobility of the moving part or downsizing the moving part. Therefore, in some cases the cables and lines are closely spaced in a single portion, including a drive system cable for connecting a drive system power supply and a motor, a control system cable for connecting a control system power supply and each control unit, and a communication line for connecting a plurality of control units. In this case, the signal of the communication line may be affected by noise generated from the drive system cable or external forces may be applied to these lines or cables due to the motion of the moving part, which is likely to disturb the first or second function of the moving body. Therefore, if an error is detected as a result of detecting the presence or absence of the error during starting the moving body (starting period), there is a great need for dealing with the error from the viewpoint of securing the first and second functions.

Therefore, the method of controlling the moving body according to the present invention to resolve the above problem comprises: an error detection step of detecting the presence or absence of a first error likely to disturb the first and second functions, a second error likely to disturb the first function while unlikely to disturb the second function, and a third error unlikely to disturb the first and second functions during a starting period from starting the power supply to the plurality of control units until starting the motion of the moving body accompanying with the operation of the actuator; a mode setting step of setting a first mode for halting the first and second functions at least after the end of the starting period if the first error is detected in the error detection step, setting a second mode for halting the first function at least after the end of the starting period and adjusting one or both of the control unit and the sensor using the second function during the starting period if the second error is detected in the error detection step, and setting a third mode for starting the motion of the moving body using the first and second functions after the end of the starting period if the third error is detected in the error detection step; and a step of controlling functions of the moving body according to the mode set in the mode setting step.

According to the control method of the present invention, the presence or absence of each of the first, second, and third errors is detected during "the starting period" of the moving body, in other words, during the period from starting the power supply to the plurality of control units until starting the motion of the moving body accompanying with the operation of the actuator.

If "the first error" is detected during the starting period of the moving body, "the first mode" is set for halting the first and second functions at least after the end of the starting period, whereby the function of the moving body is controlled according to "the first mode." "The first error" is likely to disturb "the first function (a function including a control function of the motion of the moving body accompanying with the operation of the actuator through conditioning of electric power supplied to the actuator via the drive system cable from the drive system power supply performed by the first sub-control unit)" and "the second function (a function including the alternate communications facility with the plurality of control units and a measuring function of the state quantity through the sensor of the second sub-control unit)" of the moving body. Therefore, it becomes possible to halt an unexpected motion of the moving body, which may be caused by a communication error of the plurality of control units, a measurement error of the state quantity through the sensor, a communication between control units having one of these errors, and an operation control of the actuator based on a result of erroneous measurement, by halting the first and second functions at least after the end of the starting period according to "the first mode."

Moreover, if "the second error" is detected during the starting period of the moving body, the first function is halted at least after the end of the starting period, while "the second mode" for adjusting one or both of the control unit and the sensor using the second function during the starting period, whereby the function of the moving body is controlled according to "the second mode." "The second error" is likely to disturb "the first function" such as an actuator control using the first sub-control unit, while unlikely to disturb "the second function" such as measurement of the state quantity through the sensor using the second sub-control unit. Therefore, it is possible to prevent a situation where the moving body makes an unexpected motion by halting the first function at least after the end of the starting period according to "the second mode." Moreover, if one or both of the control unit and the sensor is adjusted using the second function during the starting period of the moving body and thereby the second error is corrected thereafter, the operation control of the moving body can be rapidly started without adjusting the control unit and the sensor at restarting the moving body (during the starting period).

Moreover, if "the third error" is detected, "the third mode" is set for moving the moving body using the first and second functions after the end of the starting period, whereby the moving body is controlled according to "the third mode." "The third error" is a minor error not disturbing "the first function" such as an actuator control using the first sub-control unit and also not disturbing "the second function" such as measurement of the state quantity through the sensor of the second sub-control unit. Therefore, the motion of the moving body is controlled using the first and second functions after the end of the starting period according to "the third mode," thereby preventing a situation where the first and second functions are excessively limited.

Therefore, according to the control method of the present invention, it is possible to detect the presence or absence of an error in the functions of the moving body during starting the moving body (the starting period) and to control the functions of the moving body appropriately in view of the content of the error.

Moreover, in the control method of the present invention, the error detection step includes a first error detection step of detecting an error in a first state where the control unit is powered via the control system cable from the control system power supply while halting the power supply to the actuator via the drive system cable from the drive system power supply during the starting period of the moving body and a second error detection step of detecting an error in a second state where the control unit is powered via the control system cable from the control system power supply and the actuator is powered via the drive system cable from the drive system power supply.

Before the moving body makes a motion, the control system power supply supplies power to the plurality of control units, which constitute a distributed control system, via the control system cables and the drive system power supply supplies power to the actuator via the drive system cable. In general, the supply power from the drive system power supply is larger than the supply power from the control system power supply. Thus, noise generated during the power supply from the drive system power supply to the actuator has a strong tendency to affect a signal flowing over the communication line. Therefore, the moving body sometimes makes an unexpected motion due to an error that has occurred immediately after the power supply from the drive system power supply to the actuator though no error has been detected with the actuator not powered by the drive system power supply. Therefore, there is a great need for detecting an error disturbing the functions of the moving body with the actuator powered by the drive system power supply in the same manner as when the moving body makes a motion.

According to the control method of the present invention, an error is detected not only in "the first state (a state where the control system power supply supplies power to the control unit via the control system cable, while the drive system power supply halts the power supply to the actuator via the drive system cable)," but also in "the second state (a state where the control system power supply supplies power to the control unit via the control system cable and the drive system power supply supplies power to the actuator via the drive system cable)" during the starting period of the moving body. Thereby, the presence or absence of an error is detected with the control units and the actuator powered in the same manner as when the moving body makes a motion as in the second state. Therefore, the moving body can be reliably prevented from making an unexpected motion, which may be caused by an error that occurs immediately after the actuator is powered by the drive system power supply as described above.

Moreover, in the control method of the present invention, the error detection step includes at least one of the steps of detecting a communication error between the plurality of control units as a first error, detecting a communication error between the second sub-control unit and the sensor as a first error, detecting an error in specifications of one or both of the control unit and the sensor as a first, second, or third error, and detecting an error of an operating environment of the control unit as a first or second error.

According to the control method of the present invention, "a communication error between the plurality of control units" and "a communication error between the second sub-control unit and the sensor" can be detected as "a first error." The error significantly affects the control of the moving body and is likely to disturb a communication between the plurality of control units, the measurement of the state quantity through the sensor of the second sub-control unit, and an actuator control with the first sub-control unit based on the communication and the measured state quantity. Accordingly, the error is detected as the first error and the first and second functions are halted according to the first mode as stated above, whereby the moving body can be reliably prevented from making an unexpected motion, which may be caused by an obstacle in the actuator control with the first sub-control unit or in the measurement of the state quantity through the sensor with the second sub-control unit.

Moreover, "an error in the specifications of the control unit and the sensor" can be detected as the first, second, or third error. There are various types of errors in the specifications of the control unit and the sensor, which can include all kinds of errors such as an error unlikely to disturb the first and second functions, an error disturbing the first function while unlikely to disturb the second function, and an error likely to disturb the first and second functions. Therefore, the corresponding error is detected as the first, second, or third error individually and specifically in view of the various errors, whereby the functions of the moving body can be appropriately controlled according to the error.

Moreover, "an error in the operating environment of the control unit" can be detected as the first error or the second error. The error includes a slightly minor error in comparison with "the communication error between the plurality of control units," the error disturbing the first function while unlikely to disturb the second function, and an error equally significant and likely to disturb the first and second functions. Therefore, the error is detected as the first error or the second error individually and specifically, whereby the functions of the moving body can be appropriately controlled according to the error.

Moreover, the control method of the present invention further comprises the step of giving notice of the content of the error detected in the error detection step via notification means.

According to the control method of the present invention, a user is notified of the content of the error that has occurred in the moving body through notification means. Therefore, the user can be prompted to take appropriate and quick measures to correct the error of the moving body according to the error.

The present invention relates to a system for controlling a function of a moving body after examining whether there is any error thereof in a starting period, the moving body having a first function including a control function of a motion of the moving body accompanying with an operation of an actuator through conditioning of electric power supplied to the actuator via a drive system cable from a drive system power supply with a first sub-control unit out of a plurality of control units operating by being supplied with power via control system cables from a control system power supply and a second function including an alternate communications facility with the plurality of control units and a measuring function of a state quantity through a sensor of a second sub-control unit out of the plurality of control units.

The system for controlling the moving body according to the present invention to resolve the above problem comprises: error detection means for detecting the presence or absence of a first error likely to disturb the first and second functions, a second error likely to disturb the first function while unlikely to disturb the second function, and a third error unlikely to disturb the first and second functions during a starting period from starting the power supply to the plurality of control units until starting the motion of the moving body accompanying with the operation of the actuator; mode setting means for setting a first mode for halting the first and second functions at least after the end of the starting period if the first error is detected by the error detection means, setting a second mode for halting the first function at least after the end of the starting period and adjusting one or both of the control unit and the sensor using the second function during the starting period if the second error is detected by the error detection means, and setting a third mode for starting the motion of the moving body using the first and second functions after the end of the starting period if the third error is detected by the error detection means; and means for controlling functions of the moving body according to the mode set by the mode setting means.

According to the control system of the present invention, it is possible to detect the presence or absence of an error in the functions of the moving body during starting the moving body (the starting period) and to control the functions of the moving body appropriately in view of the content of the error in the same manner as for the aforementioned control method.

The present invention relates to program giving functions to a system for controlling a function of a moving body after examining whether there is any error thereof in a starting period, the moving body having a first function including a control function of a motion of the moving body accompanying with an operation of an actuator through conditioning of electric power supplied to the actuator via a drive system cable from a drive system power supply with a first sub-control unit out of a plurality of control units operating by being supplied with power via control system cables from a control system power supply and a second function including an alternate communications facility with the plurality of control units and a measuring function of a state quantity through a sensor of a second sub-control unit out of the plurality of control unit.

The control program according to the present invention to resolve the above problem gives the system: an error detecting function of detecting the presence or absence of a first error likely to disturb the first and second functions, a second error likely to disturb the first function while unlikely to disturb the second function, and a third error unlikely to disturb the first and second functions during a starting period from starting the power supply to the plurality of control units until starting the motion of the moving body accompanying with the operation of the actuator; a mode setting function of setting a first mode for halting the first and second functions at least after the end of the starting period if the first error is detected by the error detecting function, setting a second mode for halting the first function at least after the end of the starting period and adjusting one or both of the control unit and the sensor using the second function during the starting period if the second error is detected by the error detecting function, and setting a third mode for starting the motion of the moving body using the first and second functions after the end of the starting period if the third error is detected by the error detecting function; and a function of controlling functions of the moving body according to the mode set by the mode setting function.

According to the control program of the present invention, it is possible to give the system the functions of detecting the presence or absence of an error in the moving body during starting the moving body (the starting period) and of controlling the functions of the moving body appropriately in view of the content of the error in the same manner as for the aforementioned control method.

BRIEF DESCRIPTION OF THE DRAWINGS

The above and other objects, features and advantages of the present invention will become apparent from the following detailed description when taken with the accompanying drawing in which.

DETAILED DESCRIPTION OF THE PREFERRED EMBODIMENTS

The preferred embodiments of a control method, control system, and control program of a moving body according to the present invention will now be described in detail hereinafter with reference to the accompanying drawings.

Figure 1:
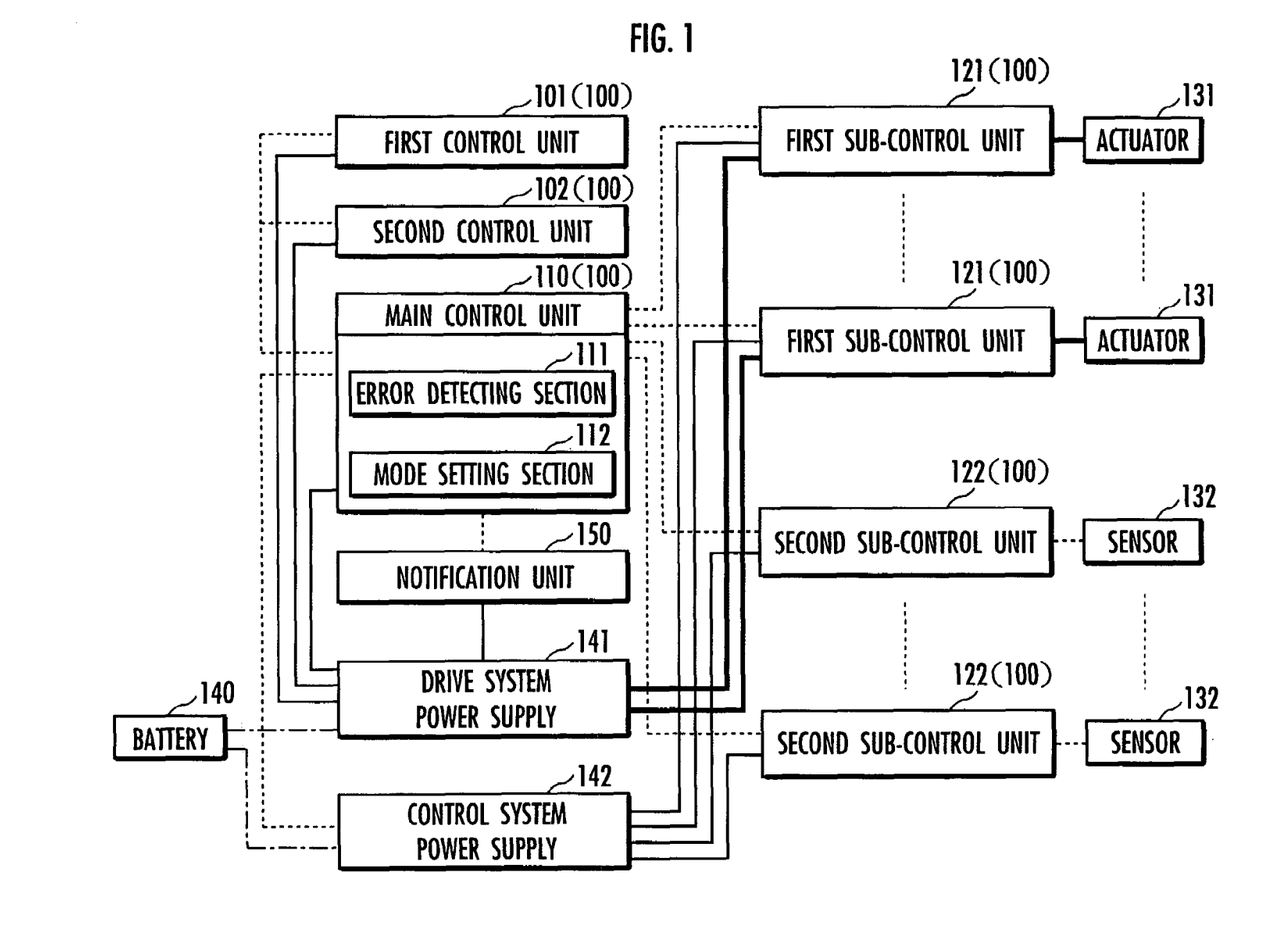
FIG. 1 is a configuration explanatory diagram of a control system according to an embodiment of the present invention.

It is assumed that the control system shown in FIG. 1 has a plurality of control units 100 and is intended to control a legged mobile robot (hereinafter, referred to as robot) 200 shown in FIG. 2.

The plurality of control units 100 includes a first control unit 101, a second control unit 102, a main control unit 110, a first sub-control unit 121, and a second sub-control unit 122. The robot 200 has a sensor 132, an actuator 131, a battery 140, a control system power supply 142, a drive system power supply 141, and a notification unit 150. A part or all of the main control unit 110, the first sub-control unit 121, the second sub-control unit 122, the first control unit 101, and the second control unit 102 constitute "means for controlling functions of the robot according to a mode." Each control unit 100 is formed of a CPU, a ROM, a RAM, a signal input/output circuit, or the like as hardware and a control program of the present invention as software for giving various functions to the hardware.

Furthermore, the first control unit 101, the second control unit 102, and the main control unit 110 are connected via communication lines (indicated by dashed lines, which is ditto with the following) so that they can communicate with each other. Moreover, the main control unit 110 is connected to each of the first sub-control unit 121 and the second sub-control unit 122 via a communication line so that they can communicate with each other. The first sub-control unit 121 is connected to the actuator 131 via a communication line so that they can communicate with each other. The second sub-control unit 122 is connected to the sensor 132 via a communication line so that they can communicate with each other.

Moreover, the battery 140 is connected to each of the drive system power supply 141 and the control system power supply 142 via a cable (indicated by a chain line). Furthermore, the drive system power supply 141 is connected to the actuator 131 via a drive system cable (indicated by a thick line) going through the first control unit 121. Still further, the control system power supply 142 is connected to each of the first control unit 101, the second control unit 102, the main control unit 110, the first sub-control unit 121, and the second sub-control unit 122 via a control system cable (indicated by a solid line).

Figure 2:
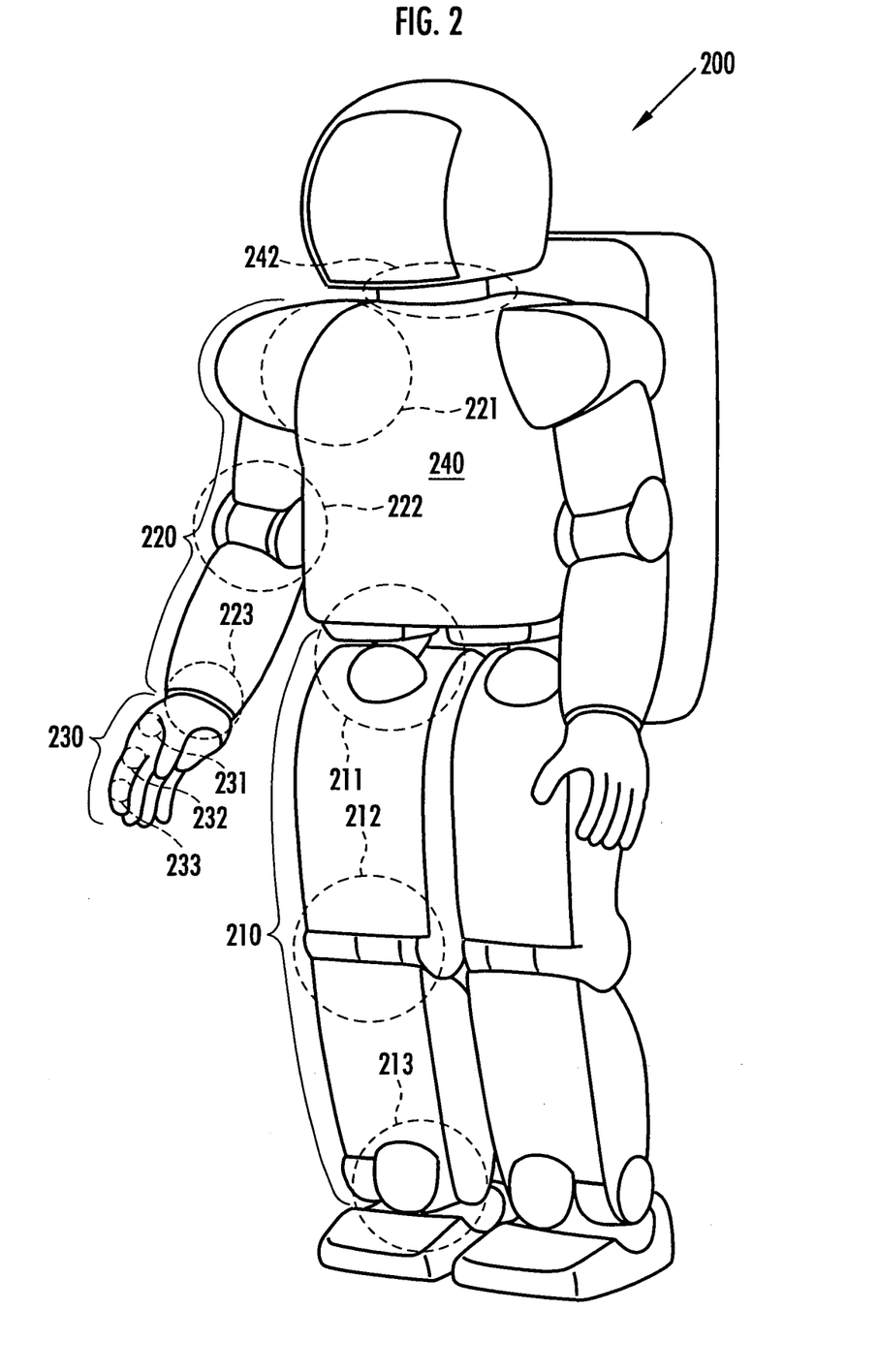
FIG. 2 is a configuration explanatory diagram of a robot to be controlled using a control method, control system, and control program according to an embodiment of the present invention.

The first control unit 101 and the second control unit 102 are installed in a lower limb 210 and an upper limb 220 of the robot 200 shown in FIG. 2, respectively, transmitting data specifying a target operation of the robot 200 to the main control unit 110.

The main control unit 110 is installed in the upper body 240 of the robot 200, controlling the entire operation of the robot 200 through communications with each of the first sub-control unit 121 and the second sub-control unit 122. The main control unit 110 controls the power supply from the drive system power supply 141 and the control system power supply 142 to the first sub-control unit 121 and the actuator 131 or the like.

Moreover, the main control unit 110 has an error detecting section 111 and a mode setting section 112 as a principal part of the present invention. The error detecting section 111 detects the presence or absence of "the first error" likely to disturb the first and second functions of the robot 200, "the second error" likely to disturb the first function while unlikely to disturb the second function, and "the third error" unlikely to disturb the first and second functions. Where the error detecting section 111 has detected an error, the mode setting section 112 sets a mode described later according to the error.

The first sub-control unit 121 is installed in the lower limb 210 or the upper limb 220 of the robot 200 and controls the supply power from the drive system power supply 141 to the actuator 131 on the basis of the communication with the main control unit 110 to control the operation of the actuator 131.

The second sub-control unit 122 is installed in the lower limb 210 or the upper limb 220 of the robot 200 and receives an output signal from the sensor 132 according to the state quantity of a joint angle, a joint torque, or the like and then sends it to the main control unit 110. The second sub-control unit 122 makes adjustment such as calibration (zero adjustment) of the sensor 132.

The actuator 131 is installed in the lower limb 210 or the upper limb 220 of the robot 200 and imparts a rotating force to a hip joint 211, a knee joint 212, and a foot joint 213 of the lower limb 210, a shoulder joint 221, an elbow joint 222 and a carpal joint 223 of the upper limb 220, three interphalangeal articulations 231, 232, and 233 of a hand 230, and a neck joint 242 of the upper body 240 directly via an output shaft or indirectly via a power transmission system (not shown) having a wire, a pulley, or the like from the output shaft. The actuator 131 may impart the rotating force to a joint having a degree of freedom of a motion other than the aforementioned joints.

The sensor 132 includes a 6-axial force sensor installed in the portion of the foot joint 213 of the robot and outputting a measurement signal according to translation forces perpendicular to each other in triaxial directions and a triaxial moment of the foot joint 213, a rotary encoder for outputting a measurement signal according to the rotation angle of the hip joint 211 or the knee joint 212, and a temperature sensor installed in the vicinity of a part or all of the control units 100 such as the first sub-control unit 121 and the second sub-control unit 122.

The battery 140 is housed in the upper body 240 and is formed by a Ni—Zn battery, a Ni-MH battery, a lithium-ion battery, or the like. The drive system power supply 141 is housed in the upper body 240 and supplies power from the battery 140 to the actuator 131 via the drive system cable (see the thick lines in FIG. 1). The control system power supply 142 is housed in the upper body 240 and supplies power from the battery 140 to the respective control units 100 via the control system cables (see the solid lines in FIG. 1).

The notification unit 150 is mounted on the back face of the upper body 240 of the robot 200, displaying the content of an error detected by the error detecting section 111 of the main control unit 110 in the form of an error code or an error message.

The robot 200 has "a first function" including a control function of a motion around a joint of the robot 200 accompanying with the operation of the actuator 131 through conditioning of power supplied from the drive system power supply 141 to the actuator 131 via the drive system cable performed by the first sub-control unit 121 and "a second function" including an alternate communications facility with the plurality of control units 100 and a measuring function of a state quantity through the sensor 132 of the second sub-control unit.

Moreover, in the robot 200, it is preferable that wiring of a joint is as compact as possible for securing mobility of the joint or downsizing the joint. Therefore, lines and cables are closely spaced in the portion of the hip joint 211, including the communication lines (see the dashed lines in FIG. 1) for connecting the main control unit 110 installed in the upper body 240 to the first control unit 101, the first sub-control unit 121, and the second sub-control unit 122 installed in the lower limb 210, respectively, drive system cables (see the thick lines in FIG. 1) for connecting the drive system power supply 141 housed in the upper body 240 to each of the actuators 131 installed in the lower limb 210, and control system cables (see the solid lines in FIG. 1) for connecting the control system power supply 142 housed in the upper body 240 to the first sub-control unit 121 and the second sub-control unit 122 installed in the lower limb 210 respectively. Similarly communication lines and cables are closely spaced in the shoulder joint 221 and the knee joint 212, too.

Figure 3:
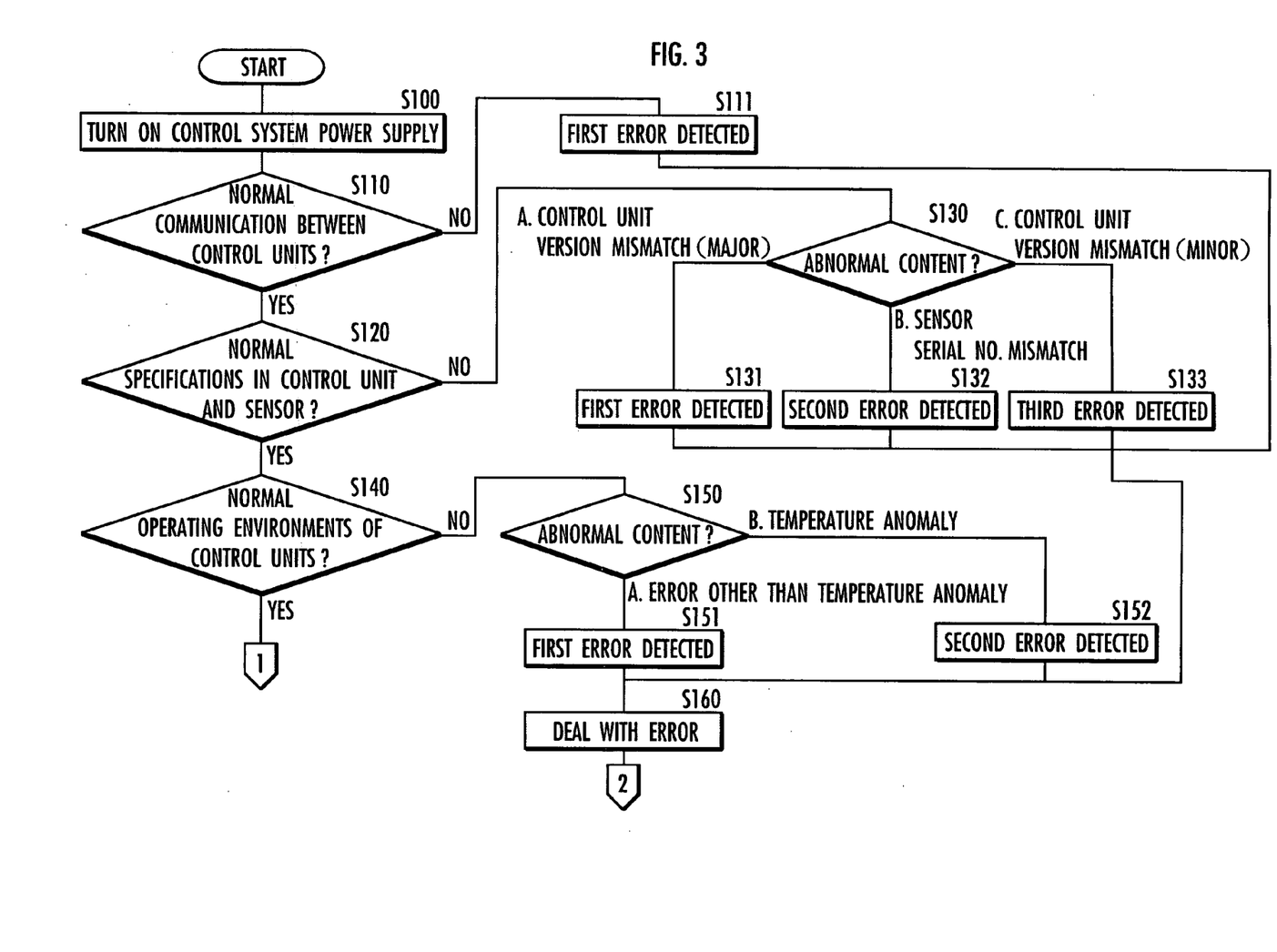
FIG. 3 is a flowchart of the control method according to the embodiment of the present invention.
Figure 4:
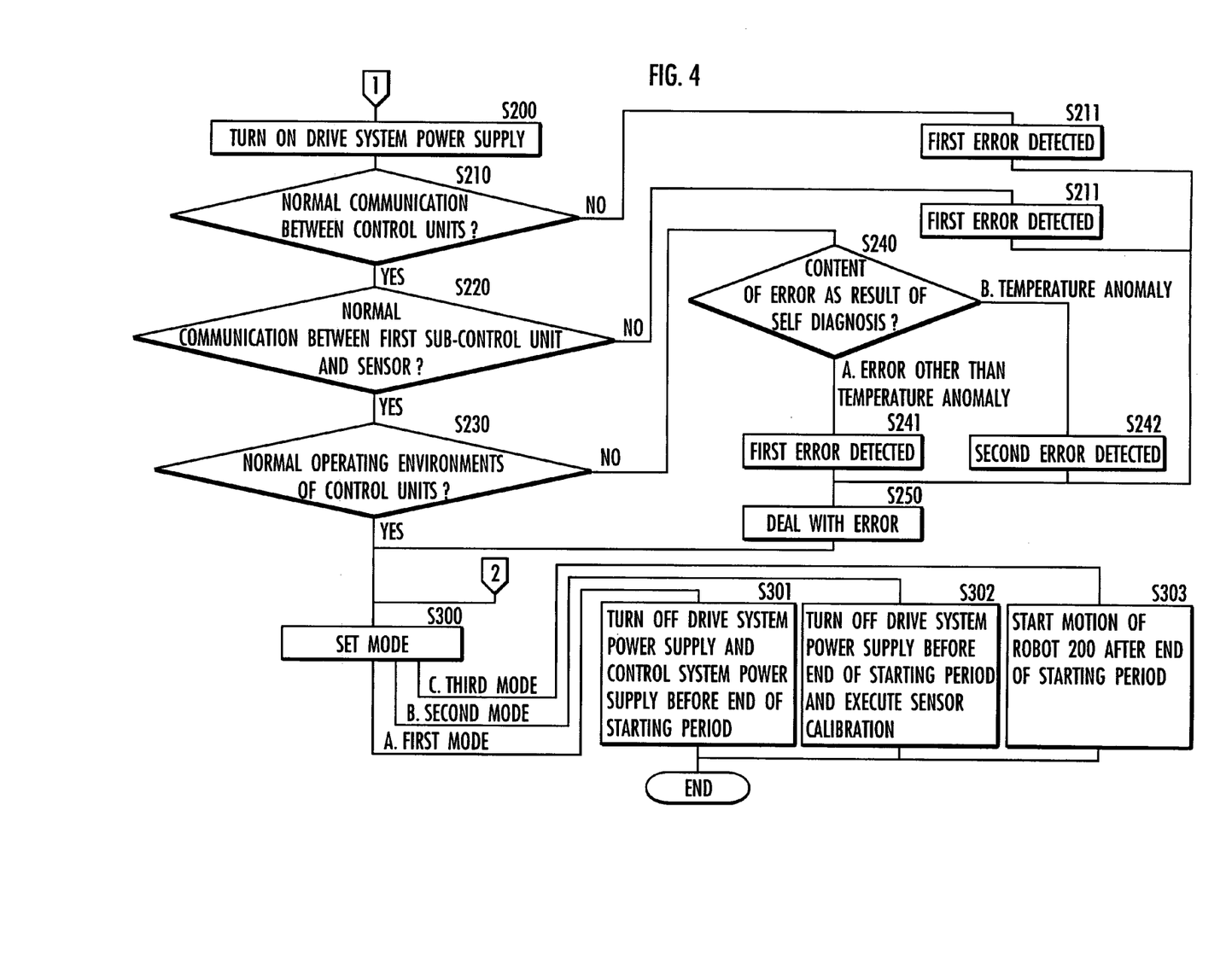
FIG. 4 is a flowchart of the control method according to the embodiment of the present invention.

The following sections provide description of a control method of the robot 200 having the above configuration (functions of the control system of the robot 200) with reference to FIG. 3 and FIG. 4.

First, the control system power supply 142 is turned on, whereby each control unit 100 is supplied with power from the control system power supply 142 (S100 in FIG. 3). Thereby, the starting period of the robot 200 is initiated. Moreover, the robot 200 is placed in "the first state" where the control system power supply 142 supplies power to the control units 100 including the first sub-control unit 121 and the second sub-control unit 122 while the drive system power supply 141 does not supply power to the actuator 131.

Subsequently, the error detecting section 111 of the control unit 110 determines whether communication is normally carried out between the main control unit 110 and each of the first control unit 101 and the second control unit 102 and between the main control unit 110 and each of the first sub-control unit 121 and the second sub-control unit 122 (S110 in FIG. 3). Specifically, where the main control unit 110 has requested another control unit 100 such as the first sub-control unit 121 or the second sub-control unit 122 to send a first acknowledgement signal such as an ID via the communication line, it is determined whether another control unit 100 concerned has sent the first acknowledgement signal to the main control unit 110.

If the error detecting section 111 determines that the communication between the plurality of control units 100 is abnormal (NO at S110 in FIG. 3), it detects the presence of "the first error" (S111 in FIG. 3). For example, if the error detecting section 111 determines that the main control unit 110 cannot communicate with the first sub-control unit 121 or the second sub-control unit 122 due to breaking of the communication line, noise on the communication line, or breaking of the control system cable, it detects the presence of "the first error."

On the other hand, if the error detecting section 111 determines that the communication between the plurality of communication units 100 is normal (YES at S110 in FIG. 3), it determines whether the specifications of each control unit 100 and the sensor 132 are normal (S120 in FIG. 3). Specifically, the error detecting section 111 determines whether the specifications of another control unit 100 are normal based on the communication between the main control unit 110 and another control unit 100 concerned. Moreover, the error detecting section 111 determines whether the specifications of the main control unit 110 are normal based on read processing from a memory forming the main control unit 110. Furthermore, the error detecting section 111 receives a result of communication between the second sub-control unit 122 and the sensor 132 from the second sub-control section 122 and then determines whether the specifications of the sensor 132 are normal based on the communication result. The specifications of the control unit 100 or the sensor 132 include a serial number of the control unit 100 or sensor 132 concerned and a version of software stored in each of the control units 100.

If the error detecting section 111 determines that the specifications of the control unit 100 or the sensor 132 are abnormal (NO at S120 in FIG. 3), it determines the content of the abnormality (S130 in FIG. 3). Specifically, if the version of the first control unit 101 differs from that of the second control unit 102 or there is a mismatch in the software version between the first sub-control unit 121 and the second sub-control unit 122 regarding the major version, which means that the current operation of the control unit differs from the previous one, the presence of "the first error" is detected (A at S130 and S131 in FIG. 3).

If the current serial number of each of the plurality of sensors 132 differs from the previous serial number registered in the memory or the like and thereby the value of the parameter necessary for correction is abnormal, the presence of "the second error" is detected (B at S130 and S132 in FIG. 3).

Furthermore, there is a mismatch in the software version between the first sub-control unit 121 and the second sub-control unit 122 regarding the minor version, which means that the current operation of the control unit is the same as the previous one, but the current functions differ from the previous ones, the presence of "the third error" is detected (C at S130 and S133 in FIG. 3).

On the other hand, if the error detecting section 111 determines that the specifications of the control unit or the like are normal (YES at S110 in FIG. 3), it determines whether the operating environment is normal for each of the first control unit 101, the second control unit 102, the main control unit 110, the first sub-control unit 121, the second sub-control unit 122, and the sensor 132 (S140 in FIG. 3). Specifically, the error detecting section 111 determines whether the ambient temperature (operating environment) of each of the control units 110 is normal on the basis of the communication between the second sub-control unit 122 and the temperature sensor 132. Moreover, the error detecting section 111 determines whether the operating environment of each of the control units 100 is normal such as, for example, whether each control unit 100 can read data originally stored in the memory by itself.

If the error detecting section 111 determines that the operating environment of the control unit 100 is abnormal (NO at S140 in FIG. 3), it determines the content of the abnormality (S150 in FIG. 3). Specifically, if an error related to hardware such as an encoder occurs in the first sub-control unit 121 or if an error related to hardware such as a sensor occurs in the second sub-control unit 122 and thereby the control unit cannot operate normally, the presence of "the first error" is detected (A at S150 and S151 in FIG. 3). Moreover, if the control unit 100 cannot operate normally due to a temperature anomaly, the presence of "the second error" is detected (B at S150 and S152 in FIG. 3).

Then, the main control unit 110 (where an error occurs in the main control unit 110, another normal control unit, if necessary) deals with the error detected by the error detecting section 111 (S160 in FIG. 3). Specifically, the main control unit 110 causes the content of the error detected by the error detecting section 111 to be displayed on the notification unit 150 in the form of an error code or the like. In addition, the mode setting section 112 sets a mode described later according to the error detected by the error detecting section 111 (S300 in FIG. 4).

On the other hand, if the error detecting section 111 determines that the operating environment of the control unit 100 is normal (YES at S140 in FIG. 3), the main control unit 110 turns on the drive system power supply 141, whereby the drive system power supply 141 supplies power to the actuator 131 (S200 in FIG. 4). This puts the robot 200 into "the second state" where the control system power supply 142 supplies power to the first sub-control unit 121 and the second sub-control unit 122 and the drive system power supply 141 supplies power to the actuator 131 during "the starring period."

Subsequently, the error detecting section 111 of the control unit 110 determines whether communication is normal between the first control unit 101, the second control unit 102 and the main control unit 110 and between the main control unit 110 and each of the first sub-control unit 121 and the second sub-control unit 122 (S210 in FIG. 4). Specifically, it determines whether the main control unit 110 has received a second acknowledgement signal from another control unit 100 such as the first sub-control unit 121 or the second sub-control unit 122 via the communication line.

If the error detecting section 111 determines that the intercommunication between the plurality of control units 100 is abnormal (NO at S210 in FIG. 4), it detects the presence of the first error (S211 in FIG. 4). The error detecting section 111 detects the presence of "the first error" if the communication is disabled between the main control unit 110 and the first sub-control unit 121 or the second sub-control unit 122 due to deterioration of a noise environment, which occurs when the drive system power supply 141 supplies power to the first sub-control unit 121, for example.

On the other hand, if the error detecting section 111 determines that the communication between the plurality of control units 100 is normal (YES at S210 in FIG. 4), it determines whether the communication is normal between the second sub-control unit 122 and the sensor 132 (S220 in FIG. 4). Specifically, the error detecting section 111 determines whether the first sub-control unit 121 can send a correction signal or the like for an offset to the sensor 132.

If the error detecting section 111 determines that the communication is abnormal between the second sub-control unit 122 and the sensor 132 (NO at S220 in FIG. 4), it detects that "the first error" is present (S221 in FIG. 4). The error detecting section 111 detects the presence of "the first error" when the main control unit 110 cannot send a parameter (a speed reduction ratio of the actuator 131, origin data, or the like) necessary for the operation of the robot 200 normally to the first sub-control unit 121 or when the main control unit 110 cannot send a parameter (an interference computation coefficient or the like) necessary for the correction of the sensor 132 normally to the first sub-control unit 121.

On the other hand, if the error detecting section 111 determines that the communication is normal between the second sub-control unit 122 and the sensor 132 (YES at S220 in FIG. 4), it determines whether the control units 100 and the sensor 132 are put in the normal operating environments (S230 in FIG. 4). Specifically, the error detecting section 111 determines whether the ambient temperatures (operating environments) of the control units 100 are normal on the basis of the communication between the second sub-control unit 122 and the temperature sensor 132. Moreover, the error detecting section 111 determines whether the operating environment of each control unit 100 is normal with the self diagnosis by determining whether the control unit 100 can read the data stored originally in the memory by itself.

If the error detecting section 111 determines that the operating environments of the control units 100 are abnormal (NO at S230 in FIG. 4), it determines the content of the abnormality (S240 in FIG. 4). Specifically, if an error of a drive voltage occurs in the first sub-control unit 121 or an error related to hardware such as the encoder occurs when the drive system power supply 141 supplies power to the first sub-control unit 121 or the like or if the second sub-control unit 122 cannot operate normally due to an error related to hardware such as the sensor 132, the error detecting section 111 detects the presence of the first error (A at S240 and S241 in FIG. 4). If the control unit cannot operate normally due to a temperature anomaly when the drive system power supply 141 supplies power to the first sub-control unit 121 or the like, the error detecting section 111 detects the presence of the second error (B at S240 and S242 in FIG. 4).

Thereafter, the main control unit 110 (where an error occurs in the main control unit 110, another normal control unit 100, if necessary) deals with the error detected by the error detecting section 111 (S250 in FIG. 4). Specifically, the main control unit 110 causes the content of the error detected by the error detecting section 111 to be displayed on the notification unit 150 in the form of an error code or the like.

In addition, the mode setting section 112 sets a mode according to the error detected by the error detecting section 111 (S300 in FIG. 4). At this point, the robot 200 has not started yet, but the starting period is ongoing.

In particular, the mode setting section 112 sets "the first mode" for halting the first and second functions at least after the end of the starting period if the error detecting section 111 detects the presence of the first error. If the error detecting section 111 detects the presence of the second error, the mode setting section 112 halts the first function at least after the end of the starting period while setting "the second mode" for adjusting one or both of each control unit 100 and the sensor 132 using the second function during the starting period. Furthermore, if the error detecting section 111 detects the presence of the third error, the mode setting section 112 sets "the third mode" for moving the robot 200 using the first and second functions after the end of the starting period.

Thereafter, the main control unit 110 or the like controls the functions of the robot 200 according to the mode set by the mode setting section 112.

Specifically, if the mode setting section 112 sets "the first mode" (A at S300 in FIG. 4), the power supply from the drive system power supply 141 to the actuator 131 is halted and the power supply from the control system power supply 142 to the plurality of control units 100 is halted before the end of the starting period (S301 in FIG. 4). Furthermore, the communication is inhibited between the main control unit 110 and each of the first sub-control unit 121 and the second sub-control unit 122. This halts the first and second functions at least after the end of the starting period of the robot 200.

If the mode setting section 112 sets "the second mode" (B at S300 in FIG. 4), the power supply from the drive system power supply 141 to the actuator 131 is halted while carrying out adjustment of the control unit 100 or calibration or other adjustment of the sensor 132 (S302 in FIG. 4). Thereby, the first function allows a halt of the operation control of the actuator 131 after the end of the starting period and adjusts of the control unit 100 and the sensor 132 during the starting period. Particularly, while "the 6-axial force sensor" is provided as the sensor 132 in the lower part of the lower limb 210 of the robot 200, the zero point tends to be out of alignment. Therefore, the calibration (zero adjustment) is very useful for an accurate operation control of the robot 200 after correcting the error.

Moreover, even if the starting period terminates where the mode setting section 112 sets "the third mode" (C at S300 in FIG. 4), the second state (state where the drive system power supply 141 supplies power to the actuator 131 and the control system power supply 142 supplies power to the control units 100) is maintained and the robot 200 is started by the operation control or the like of the actuator 131 with the first sub-control unit 121 (S303 in FIG. 4). If the third mode is set, the control unit 100 or the sensor 132 may be adjusted during the starting period of the robot 200 similarly to the second mode.

As stated above, the communication lines (see the dashed lines in FIG. 1), the control system cables (see the solid lines in FIG. 1), and the drive system cables (see the thick lines in FIG. 1) are closely spaced particularly in the hip joint 211, the knee joint 212, and the shoulder joint 221 of the robot 200. Therefore, the signal of the communication line may be affected by noise generated from the drive system cable or external forces may be applied to these lines or cables due to the motion of the joint portion, which is likely to disturb the first or second function of the robot 200. Therefore, if an error is detected as a result of detecting the presence or absence of the error during starting the robot 200 (starting period), there is a great need for dealing with the error from the viewpoint of securing the first and second functions.

According to the above control method, if "the first error" is detected by the error detecting section 111 during "the starting period" of the robot 200 (see S111, S131, and S151 in FIG. 3 and S211, S221, and S242 in FIG. 4), the mode setting section 112 sets "the first mode" (see A at S300 in FIG. 4), whereby the functions of the robot 200 are controlled according to "the first mode" (see S301 in FIG. 4). "The first error" is likely to disturb "the first function (a function including the control function of the motion of the robot 200 accompanying with the operation of the actuator 131 through conditioning of electric power supplied to the actuator 131 via the drive system cable from the drive system power supply 141 performed by the first sub-control unit 121)" and "the second function (a function including the alternate communications facility with the plurality of control units 100 and the measuring function of the state quantity through the sensor 132 of the second sub-control unit 122)" of the robot 200. Therefore, it becomes possible to halt an unexpected motion of the robot 200, which may be caused by a communication error of the plurality of control units 100, a measurement error of the state quantity through the sensor 132, a communication between control units 100 having one of these errors, and an operation control of the actuator 131 based on a result of erroneous measurement, by halting the first and second functions at least after the end of the starting period according to "the first mode."

Moreover, if the error detecting section 111 detects that "the second error" is present during "the starting period" of the robot 200 (see S132 and S152 in FIG. 3 and S242 in FIG. 4), the mode setting section 112 sets "the second mode" (see B at S300 in FIG. 4), whereby the functions of the robot 200 are controlled according to "the second mode" (see S302 in FIG. 4). "The second error" is likely to disturb "the first function" such as the control of the actuator 131 with the first sub-control unit 121, while unlikely to disturb "the second function" such as measurement of a state quantity through the sensor 132 using the second sub-control unit 122. Therefore, it is possible to prevent a situation where the robot 200 makes an unexpected motion by halting the first function at least after the end of the starting period according to "the second mode." Moreover, if one or both of the control unit 100 and the sensor 132 is adjusted using the second function during the starting period of the robot 200 and thereby the second error is corrected thereafter, the operation control of the robot 200 can be rapidly started without adjustment of the control unit 100 and the sensor 132 during the starting period at restarting the robot 200.

Moreover, if the error detecting section 111 detects "the third error" during "the starting period" of the robot 200 (see S133 in FIG. 3), the mode setting section 112 sets "the third mode" (see C at S300 in FIG. 4), whereby the functions of the robot 200 are controlled according to "the third mode" (see S303 in FIG. 4). "The third error" is a minor error not disturbing "the first function" such as the control of the actuator 131 with the first sub-control unit 121, and also not disturbing "the second function" such as measurement of a state quantity through the sensor 132 of the second sub-control unit 122. Therefore, the motion of the robot 200 is controlled using the first and second functions after the end of the starting period according to "the third mode," thereby preventing a situation where the first and second functions are excessively limited.

Therefore, according to the control method of the present invention, it is possible to detect the presence or absence of an error in the functions of the robot 200 during starting the robot 200 (the starting period) and to control the functions of the robot 200 appropriately in view of the content of the error.

Before the robot 200 makes a motion, the control system power supply 142 supplies power to the plurality of control units 100 and the drive system power supply 141 supplies power to the actuator 131. The supply power from the drive system power supply 141 is larger than the supply power from the control system power supply 142 and thus noise generated during the power supply from the drive system power supply 141 to the actuator 131 has a strong tendency to affect a signal flowing over the communication line. Therefore, in some cases the robot 200 makes an unexpected motion due to an error that has occurred immediately after the power supply from the drive system power supply 141 to the actuator 131 though no error has been detected with the actuator 131 not powered by the drive system power supply 141. Therefore, there is a great need for detecting the presence or absence of an error disturbing the functions of the robot 200 with the actuator 131 powered by the drive system power supply 141 in the same manner as when the robot 200 makes a motion.

According to the aforementioned control method, the error detecting section 111 detects the presence or absence of an error not only in "the first state" (see S110, S120, and S140 in FIG. 3. It corresponds to "the first error detection step"), but also in "the second state" (see S210, S220, and S230 in FIG. 4. It corresponds to "the second error detection step") during "the starting period" of the robot 200. Thereby, the presence or absence of an error is detected with the control units 100 and the actuator 131 powered in the same manner as when the robot 200 makes a motion as in the second state. Therefore, the robot 200 can be reliably prevented from making an unexpected motion, which may be caused by an error immediately after the actuator 121 is powered by the drive system power supply 141 as described above.

According to the aforementioned control method, if there are "a communication error between the plurality of control units 100" and "a communication error between the second sub-control unit 122 and the sensor 132," the error detecting section 111 detects the presence of "the first error" (see S111 and S131 in FIG. 3 and S211 and S221 in FIG. 4). The error significantly affects the control of the robot 200 and is likely to disturb the measurement of the state quantity through the sensor 132 with the second sub-control unit 122 and the control of the actuator 131 with the first sub-control unit 121 based on the measured state quantity. Accordingly, if the above error is detected, the first and second functions of the robot 200 are halted at least after the end of the starting period according to the first mode as stated above, whereby the robot 200 can be reliably prevented from making an unexpected motion, which may be caused by an obstacle in the control of the actuator 131 with the first sub-control unit 121, in the communication between the plurality of control units 100, or in the measurement of the state quantity through the sensor 132 with the second sub-control unit 122.

Moreover, if there is "an error in the specifications of the control units 100 and the sensor 132," the error detecting section 111 detects the presence of the first, second, or third error (see S131, S132, and S133 in FIG. 3). There are various types of errors in the specifications of the control units 100 and the sensor 132, including an error likely to disturb the first and second functions (the first error), an error disturbing the first function while unlikely to disturb the second function (the second error), and an error unlikely to disturb the first and second functions (the third error). Therefore, if there is the relevant error, it is detected as the first, second, or third error individually and specifically in view of the various types of errors, whereby the functions of the robot 200 can be appropriately controlled according to the error.

Moreover, if there is "an error in the operating environment of the control units 100," the error detecting section 111 detects that the first error or the second error is present (see S151 and S152 in FIG. 3 and S241 and S242 in FIG. 4). The error includes a slightly minor error in comparison with "the communication error between the plurality of control units 100," the error disturbing the first function while unlikely to disturb the second function, and an error equally significant and likely to disturb the first and second functions. Therefore, if there is the relevant error, the presence of the first error or the second error is detected individually and specifically, whereby the functions of the robot 200 can be appropriately controlled according to the error.

According to the aforementioned control method, a user is notified of the content of the error in the robot 200 through the notification unit 150 (see S160 in FIG. 3 and S250 in FIG. 4). Therefore, the user can be prompted to take appropriate and quick measures to correct the error of the robot 200.

While the moving body is the robot 200 shown in FIG. 2 in the preferred embodiment, it may be any of all kinds of machines or devices having a joint that can be bent or unbent with an actuator used as a power source such as an engineering robot having an arm as another embodiment.

While the error detecting section 111 and the mode setting section 112 are provided in the main control unit 110 in the preferred embodiment (see FIG. 1), the error detecting section 111 and the mode setting section 112 may be provided together or separately in one of the main control unit 110, the first control unit 101, and the second control unit 102 as another embodiment.

What is claimed is:

1. A method of controlling a function of a moving body after examining whether there is any error thereof in a starting period, the moving body having a first function including a control function of a motion of the moving body accompanying with an operation of an actuator through conditioning of electric power supplied to the actuator via a drive system cable from a drive system power supply with a first sub-control unit out of a plurality of control units operating by being supplied with power via control system cables from a control system power supply and a second function including an alternate communications facility with the plurality of control units and a measuring function of a state quantity through a sensor of a second sub-control unit out of the plurality of control units, the method comprising:

an error detection step of detecting the presence or absence of a first error likely to disturb the first and second functions, a second error likely to disturb the first function while unlikely to disturb the second function, and a third error unlikely to disturb the first and second functions during a starting period from starting the power supply to the plurality of control units until starting the motion of the moving body accompanying with the operation of the actuator;

a mode setting step of:
setting a first mode for halting the first and second functions at least after the end of the starting period if the first error is detected in the error detection step;
setting a second mode for halting the first function at least after the end of the starting period and adjusting one or both of the control unit and the sensor using the second function during the starting period if the second error is detected in the error detection step; and
setting a third mode for starting the motion of the moving body using the first and second functions after the end of the starting period if the third error is detected in the error detection step; and a step of controlling functions of the moving body according to the mode set in the mode setting step.

2. The control method according to claim 1, wherein the error detection step includes:
a first error detection step of detecting an error in a first state where the control unit is powered via the control system cable from the control system power supply while halting the power supply to the actuator via the drive system cable from the drive system power supply during the starting period of the moving body; and
a second error detection step of detecting an error in a second state where the control unit is powered via the control system cable from the control system power supply and the actuator is powered via the drive system cable from the drive system power supply.

3. The control method according to claim 1, wherein the error detection step includes at least one of the steps of detecting a communication error between the plurality of control units as a first error, detecting a communication error between the second sub-control unit and the sensor as a first error, detecting an error in specifications of one or both of the control unit and the sensor as a first, second, or third error, and detecting an error of an operating environment of the control unit as a first or second error.

4. The control method according to claim 1, further comprising the step of giving notice of the content of the error detected in the error detection step via notification means.

5. A system for controlling a function of a moving body after examining whether there is any error thereof in a starting period, the moving body having a first function including a control function of a motion of the moving body accompanying with an operation of an actuator through conditioning of electric power supplied to the actuator via a drive system cable from a drive system power supply with a first sub-control unit out of a plurality of control units operating by being supplied with power via control system cables from a control system power supply and a second function including an alternate communications facility with the plurality of control units and a measuring function of a state quantity through a sensor of a second sub-control unit out of the plurality of control units, the system comprising:

error detection means for detecting the presence or absence of a first error likely to disturb the first and second functions, a second error likely to disturb the first function while unlikely to disturb the second function, and a third error unlikely to disturb the first and second functions during a starting period from starting the power supply to the plurality of control units until starting the motion of the moving body accompanying with the operation of the actuator;

mode setting means for:

setting a first mode for halting the first and second functions at least after the end of the starting period if the first error is detected by the error detection means;

setting a second mode for halting the first function at least after the end of the starting period and adjusting one or both of the control unit and the sensor using the second function during the starting period if the second error is detected by the error detection means; and     setting a third mode for starting the motion of the moving body using the first and second functions after the end of the starting period if the third error is detected by the error detection means; and means for controlling functions of the moving body according to the mode set by the mode setting means.

6. A program giving functions to a system for controlling a function of a moving body after examining whether there is any error thereof in a starting period, the moving body having a first function including a control function of a motion of the moving body accompanying with an operation of an actuator through conditioning of electric power supplied to the actuator via a drive system cable from a drive system power supply with a first sub-control unit out of a plurality of control units operating by being supplied with power via control system cables from a control system power supply and a second function including an alternate communications facility with the plurality of control units and a measuring function of a state quantity through a sensor of a second sub-control unit out of the plurality of control units, the program giving the system:

an error detecting function of detecting the presence or absence of a first error likely to disturb the first and second functions, a second error likely to disturb the first function while unlikely to disturb the second function, and a third error unlikely to disturb the first and second functions during a starting period from starting the power supply to the plurality of control units until starting the motion of the moving body accompanying with the operation of the actuator;

a mode setting function of:

setting a first mode for halting the first and second functions at least after the end of the starting period if the first error is detected by the error detecting function;

setting a second mode for halting the first function at least after the end of the starting period and adjusting one or both of the control unit and the sensor using the second function during the starting period if the second error is detected by the error detecting function; and     setting a third mode for starting the motion of the moving body using the first and second functions after the end of the starting period if the third error is detected by the error detecting function; and a function of controlling functions of the moving body according to the mode set by the mode setting function.

\* \* \* \* \*